(12) United States Patent
Norton

(10) Patent No.: US 6,224,094 B1
(45) Date of Patent: May 1, 2001

(54) FORCE SENSOR FOR SEAT OCCUPANT WEIGHT SENSOR

(76) Inventor: Peter Norton, P.O. Box 62, Northville, MI (US) 48167

(\*) Notice: Subject to any disclaimer, the term of this patent is extended or adjusted under 35 U.S.C. 154(b) by 0 days.

(21) Appl. No.: 09/081,194

(22) Filed: May 19, 1998

(51) Int. Cl.$^7$ ............................................ B60R 21/32

(52) U.S. Cl. ........................ 280/735; 73/744; 73/745; 73/746

(58) Field of Search .............................. 280/734, 735; 73/862.581, 744, 745, 746

(56) References Cited

U.S. PATENT DOCUMENTS 3,789,949 \* 2/1974 Bortfeld et al. .
4,201,081 \* 5/1980 Bonomo ........................... 73/862.581
4,852,675 \* 8/1989 Wang .............................. 73/862.581

\* cited by examiner

*Primary Examiner*—Eric Culbreth

(57) ABSTRACT

A force sensor for sensing the weight of a vehicle seat occupant for a vehicle's occupant protection system has a pressure sensor responsive to hydraulic pressure resulting from axial force applied to the force sensor. A constant force spring in the form of a diaphragm with two flanges simultaneous functions as a seal, a constant force bias spring, an armature support resistant to radial forces and a piston for converting force to hydraulic pressure. Two studs receive applied force. An electrical insulator is sealed to the walls of a passage inside of one of the studs to provide electrical communication while sealing against liquid leakage. A pressure sensor is mounted on the electrical insulator and connected to electrical conductors in the insulator by stitch bonding. The diaphragm resists radial movement while allowing axial movement thereby making the sensor insensitive to radial forces. By being a constant force spring the diaphragm makes the sensor insensitive to temperature variations.

21 Claims, 1 Drawing Sheet

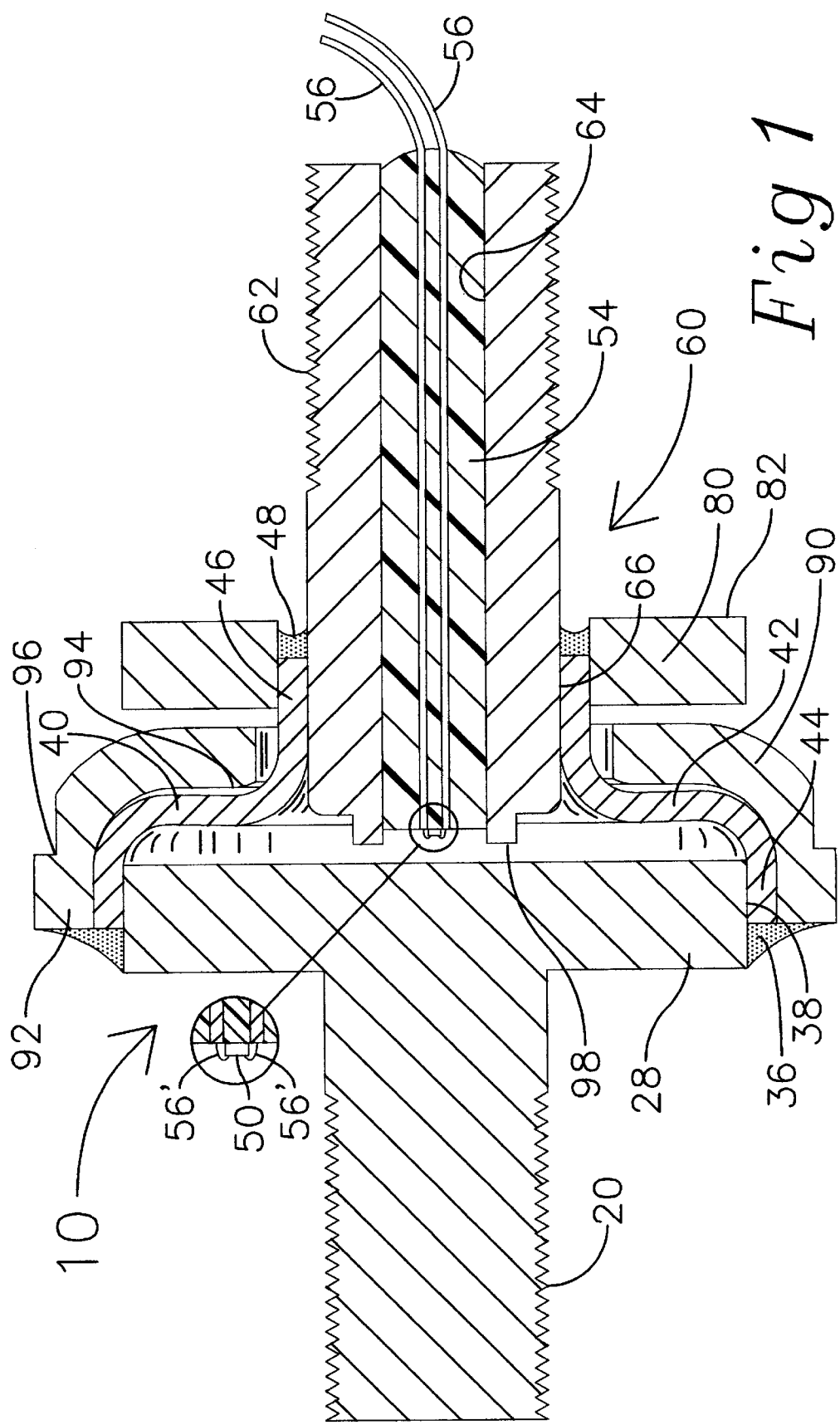

FORCE SENSOR FOR SEAT OCCUPANT WEIGHT SENSOR

FIELD OF THE INVENTION

This invention relates to sensors responsive to axial force and insensitive to lateral force for sensing weight of a vehicle occupant for providing information needed for optimum deployment of such as air bags or belt tensioners.

BACKGROUND OF THE INVENTION

It is well known to sense a force by using that force to generate hydraulic pressure which is measured to ascertain the magnitude of the force. Such devices typically include a piston in a cup with a seal on the diameter of the piston to prevent liquid leakage. A connection to the liquid filled chamber provides pressurized liquid to a pressure gage which is calibrated to read in units of force.

Semiconductor pressure sensors are manufactured in large quantities by micromachining silicon wafers. Many designs based on many technologies and many physical principles are known. Many of these sensors require additional circuitry to achieve a useful function. Typically, an integrated circuit complements the micromachined pressure sensing element. Certain of these sensors are suitable for operation submersed in liquid and operate by sensing the pressure in the liquid.

Force sensors that convert force to hydraulic pressure have the disadvantage that they are unresponsive to forces that tend to draw the piston away from the liquid and create a vacuum. To measure forces in both directions a bias force on the piston is required which has the consequence that in the case of zero applied force a substantial pressure is being measured with a potential for drift with temperature and time.

Welding and brazing are common methods of joining metals that provides good strength and sealing against leakage. Welding commonly means joining metals by melting the metals being joined at the joint with or without addition of more metal. Brazing commonly means applying a different metal at the joint that wets the metals and hardens to join the metals.

Belleville springs are washers formed to be slightly conical (dished). Certain Belleville springs are called "constant force springs" because the force required to compress the spring is approximately independent of the amount of compression over a range of compressions. Belleville springs having a dish height to thickness ratio of about 1.4 are constant force springs when they are compressed to flatness. Herein, the term "constant force spring" is defined to include Belleville springs and other springs comprising dished washers operating in a range of compressions at which the spring force or pressure the spring force causes in a fluid confined by the spring is approximately independent of the spring compression.

It is well known to reduce the number of wires required for connection to a sensor to two by the sensor simultaneously drawing power through the two wires to power itself and by drawing pulses of current over and above the current required to power itself and modulating the width or magnitude of the pulses of current to indicate the physical quantity being sensed.

A general object of this invention is to provide a force sensor that is particularly adapted for sensing force resulting from the weight of an occupant of a seat of a vehicle for informing occupant protection systems of automotive vehicles which also overcomes certain disadvantages of the prior art.

SUMMARY OF THE INVENTION

The invention is based on the realizations that "O" rings must be eliminated if a hydraulic seat force sensor is to have minimum internal friction and that a constant force spring is required to eliminate sensitivity to temperature variations. Both of these requirements are met by providing a constant force spring with flanges on its inside and outside diameters for sealing by welding. This design has the additional advantage of providing support for an armature that allows axial movement but resists radial movement.

A force sensor is provided for sensing weight of the occupant of a vehicle seat comprising a pressure sensor sensing the pressure in a liquid filled cavity defined by two elements joined by a resilient diaphragm that is also a constant force spring that provides a constant pressure in the liquid in the absence of applied force.

Further, in accordance with the invention, the diaphragm has a resilient element in a form approximating a Belleville constant force spring.

Further, in accordance with the invention, the diaphragm comprising a Belleville spring also functions as a piston thereby combining the functions of piston and spring to reduce manufacturing cost.

Further, in accordance with the invention, the diaphragm is welded at its inside and outside diameters thereby eliminating the need for sealing means such as "O" rings thereby combining the functions of piston and seal to reduce manufacturing cost and further to reduce friction and improve the accuracy of the force measurement.

Further, in accordance with the invention, all liquid sealing except at an electrical insulator is accomplished by welding, whereby the force sensor is highly reliable, compact, and economical to manufacture.

Further, in accordance with the invention, the force sensor is responsive to axial force but not to lateral force by virtue of the resistance of the resilient diaphragm to lateral distortion.

A complete understanding of this invention may be obtained from the description that follows taken with the accompanying drawings.

DESCRIPTION OF THE DRAWING

FIG. 1 shows a complete force sensor of the invention with some parts shown in section.

BEST MODE FOR CARRYING OUT THE INVENTION

The FIGURE illustrates a force sensor 10 comprising a flanged stud 20 and an armature 60 joined by a diaphragm 40 with a flange 80, restraining cover 90 and filled with a liquid 98.

Flanged stud 20 is preferably made of steel for mounting to such as the floor pan of a vehicle and has shoulder 28 for abutting the part (i.e. floor pan) to which flanged stud 20 is attached. Flanged stud 20 also includes a body having cylindrical surface 38 for attachment by welding, brazing or interference fitting to flange 44 of diaphragm 40 and flange 92 of restraining cover 90.

Diaphragm 40 includes resilient conical section 42 and cylindrical flanges 44 and 46 at its outer diameter and inner diameter respectively. Resilient conical section 42 flexes to operate in combination with stud 62 and electrical insulator 54 as a piston to translate axial force between stud 20 and stud 62 to pressure in liquid 98 that is sensed by pressure sensor 50. Diaphragm 40 operates as a constant force spring to maintain a constant pressure in liquid 98 when no axial force is being applied between studs 20 and 62. An approximation to a design providing constant pressure can be obtained by making resilient conical section 42 in the shape of a Belleville constant force spring providing the desired constant force. However, the resiliency of the portion of diaphragm 40 between flange 44 and resilient conical section 42 and the resiliency of the portion of diaphragm 40 between flange 46 and resilient conical section 42 tend to cause a positive variation of pressure with temperature even if resilient conical section 42 operates as a constant force spring.

To enable force sensor 10 to provide a truly constant pressure output over the range of operating temperatures a more refined design is obtained by modeling the sensor using any of the commercially available finite element modeling computer programs known to those skilled in the art of finite element modeling to be suitable for modeling the stresses in diaphragm 40 caused by pressure in liquid 98. Using the finite element modeling program the thickness of the material of which diaphragm 40 is made and the axial distance between the outer diameter of resilient conical section 42 and the inner diameter of resilient conical section 42 are adjusted to obtain the desired constant pressure.

Diaphragm 40 resists relative radial motion between its flanges 44 and 46. Resilient conical section 42 can also flex to permit a small angular misalignment between the centerlines of studs 20 and 62. Flange 44 of diaphragm 40 is preferably attached by weld or braze 36 to cylindrical surface 38 of flanged stud 20 and to flange 92 of restraining cover 90. Flange 46 of diaphragm 40 is preferably attached by weld or braze 48 to outer diameter 66 of stud 62 and to the inside diameter of flange 80. Welds or brazings 36 and 48 are the preferred attachment method because these joints may have to withstand large forces during a vehicle accident and because welding and brazing provide good resistance to leakage of liquid 98.

Armature 60 includes stud 62 for attachment to such as the frame of a seat and flange 80 having surface 82 for abutting the surface of the element to which stud 62 is attached. Stud 62 has outer diameter 66 for attachment by weld or braze 48 to flange 46 of diaphragm 40 and to flange 80. Flange 80 and flange 46 are preferably joined to stud 62 by a single weld or braze 48. Armature 60 also includes electrical insulator 54 into which electrical conductors 56 are molded or potted. Electrical insulator 54 is situated inside stud 62. Armature 60 also includes pressure sensor 50 mounted on the inside end of electrical insulator 54.

Electrical insulator 54 insulates electrical conductors 56 from electrical contact with stud 62 and seals against leakage of liquid 98 from the interior of force sensor 10.

Pressure sensor 50 is a solid state pressure sensor for sensing the pressure of liquid 98. Pressure sensor 50 is preferably a micromachined silicone pressure sensor. It may be a single piece of passivated silicone with all required pressure sensing and compensation circuitry included or it may be a pair of pieces of silicone, one having the micromachined pressure sensor and the second having circuitry for interfacing between the micromachined pressure sensor and a circuit elsewhere in an automobile. Pressure sensor 50 is mounted on electrical insulator 54 with a resilient adhesive so as to not impose strain that might affect the performance of pressure sensor 50. Pressure sensor 50 is electrically connected to the ends of electrical conductors 56 by fine aluminum or gold wires 56' between pads (not illustrated) on pressure sensor 50 and the ends of electrical conductors 56.

Flange 80 is preferably a mild steel or slightly hardened steel washer.

Restraining cover 90 prevents damage to diaphragm 40 in the event of a large tensile force between stud 20 and stud 62 that would stress diaphragm beyond its elastic limit if restraining cover 90 were not present. Restraining cover 90 also prevents damage to diaphragm 40 in the event of excessive compressive force between stud 20 and stud 62.

Liquid 98 may be any of the liquids known to be compatible with steel and also with the plastic molding compound of which electrical insulator 54 is made and also with micromachined pressure sensor 50.

The materials referred to hereinabove are only suggestions and other materials may be selected by those skilled in the relevant arts.

A preferred method of manufacture of force sensor 10 will now be described with reference to the FIGURE.

Flanged stud 20 and stud 62 are preferably made of steel by any of the processes known to be suitable by those skilled in the art of making threaded fasteners. The cylindrical surface 38 of flanged stud 20 may be turned on a lathe to achieve an accurate diameter to enable an interference fit to the inside surface of flange 44. The outside diameter of stud 62 may be turned on a lathe to achieve an accurate diameter at outer diameter 66 where it is fitted to flange 46 of diaphragm 40. If electrical insulator 54 is made by potting the inside diameter 64 of stud 62 is preferably made by drilling or any low cost process because great accuracy is not required. If electrical insulator 54 is injection molded and then sealed to inside diameter 64 of stud 62 then the inside diameter 64 is preferably made by drilling followed by reaming or by any other process suitable for providing an accurate and slightly tapered hole to match the taper of the outside diameter of electrical insulator 54.

Diaphragm 40 is preferably formed on a progressive die machine from a sheet of untempered spring steel and hardened by tempering after it is formed. The forming should be done with sufficient attention to accuracy to assure interference fits to cylindrical outer diameters 38 and 66.

Restraining cover 90 is preferably formed on a progressive die machine from a sheet of untempered medium carbon steel. It may be strengthened by tempering after it is formed. The forming should be done with sufficient attention to accuracy to assure that the interference fit to flange 44 is actually an interference fit yet not so tight as to decrease the diameter of flange 44 excessively.

Diaphragm 40 and restraining cover 90 are preferably welded together before diaphragm 40 is joined to studs 20 and 62. Diaphragm 40 and restraining cover 90 are placed together in the relative positions illustrated in the FIGURE and joined by welding, preferably by a laser or electron beam applied briefly to the line where they meet. The weld must be accomplished quickly and cooled rapidly afterward so that resilient conical section 42 or at the adjacent transition to flange 44 of diaphragm 40 are not heated to temperatures that could affect the temper.

Diaphragm 40 now welded to restraining cover 90, stud 62 and flange 80 are joined by weld or braze 48 to form a subassembly. These parts are positioned in the positions relative to each other illustrated in the FIGURE and weld or braze 48 is made with equipment known to be suitable by those skilled in the art of welding or brazing in large volume assembly systems. Weld or braze 48 must be accomplished quickly and cooled rapidly afterward so that diaphragm 40 is not heated to a temperature that could affect the temper at resilient conical section 42 or at the adjacent transition to flange 46.

Two methods for making and installing electrical insulator 54 in stud 62 will be described. The first method of manufacture is to position electrical conductors 56 in stud 62 and fill stud 62 with potting material suitable for providing electrical insulation and sealing. A potting material for this purpose is preferably an epoxy of the type that has minimul shrinkage upon curing.

A second method of manufacture begins by insert molding thermoplastic material around electrical conductors 56 in an injection molding machine to form electrical insulator 54. According to this method, electrical insulator 54 and the inside diameter 64 of stud 62 are made with matching tapers. The inside surface 64 of stud 62 is briefly exposed to high temperature gas flow or other source of heat that heats the surface of inside diameter 64 to a temperature above the melting temperature of the thermoplastic compound of which electrical insulator 54 is made. The heating causes the diameter of inside surface 64 to expand which enables electrical insulator 54 to be inserted easily. After the inside diameter 64 is heated, electrical insulator 54 is immediately and rapidly placed in its desired position. After electrical insulator 54 is inserted in stud 62. the heat causes the outside surface of electrical insulator 54 to melt. As stud 62 cools and shrinks it presses on the plastic of electrical insulator 54. As stud 62 continues to cool the melted plastic hardens to form a seal. This process has been found to work with Ryton R9 supplied by Philips Petroleum of Bartlesville Okla. and it is believed it will work with many other thermoplastic molding compounds.

After electrical insulator 54 is manufactured and mounted in stud 62 the inside surface is abraded slightly and cleaned to assure clean surfaces at the ends of electrical conductors 56. A dip in a gold plating solution may further assure reliable bonding to the ends of electrical conductors 56. Pressure sensor 50 is installed by applying a small drop of resilient adhesive to the end of electrical insulator 54 and placing pressure sensor 50 on the adhesive. Pads on pressure sensor 50 are then connected to the exposed ends of electrical conductors 56 by ultrasonic welding (often called "stitch bonding") wires 56' of aluminum or gold as is commonly done in the field of mounting semiconductor dice on lead frames.

The assembly including stud 62 is oriented with the axis of stud 62 vertical and supported at notch 96. Electrical connection is made to pressure sensor 50 so the pressure can be sensed. A predetermined amount of liquid is placed to cover pressure sensor 50. In a vacuum stud 20 is forced down to create an interference attachment to flange 44 of diaphragm 40. As the position illustrated in the FIGURE is approached the internal pressure is monitored through the output of pressure sensor 50. The pressure will rise and reach a plateau because of the constant force characteristic described hereinabove of diaphragm 40. After the plateau is reached stud 20 is pressed a further small predetermined distance such as 0.1 to 0.25 millimeters to place diaphragm approximately in the center of its region of stress where the pressure is constant. While held in this position weld or braze 36 is applied. Weld or braze 48 must be accomplished quickly and cooled rapidly afterward so that diaphragm 40 is not heated to a temperature that could affect the temper at resilient conical section 42 or at the adjacent transition to flange 44. This completes the manufacture of force sensor 10.

The materials and designs referred to hereinabove are preferred but other materials and designs may be selected by those skilled in the relevant arts.

The operation of force sensor 10 will now be described with reference to the FIGURE.

When no axial force is being applied between stud 20 and stud 62 the pressure in liquid 98 is at a positive pressure determined by the force applied by diaphragm 40. Under these conditions pressure sensor 50 produces an output indicating the positive pressure in liquid 98. When an axial force is applied between stud 20 and stud 62 diaphragm 40 flexes slightly which allows the force to affect the pressure in liquid 98. If the forces are directed toward each other the pressure in liquid 98 is increased and the output of the pressure sensor 50 indicates a more positive pressure. If the forces are directed away from each other the pressure in liquid 98 is decreased and the output of the pressure sensor 50 indicates a less positive pressure.

If the force between the studs is tensile and exceeds the maximum tensile force that force sensor 10 is designed to withstand, diaphragm 40 is drawn away from liquid 98 and a void occurs. Damage to diaphragm 40 is prevented by restraining cover 90. Surface 94 of restraining cover 90 imposes itself in the path of the inside diameter of resilient conical section 42 near flange 46 and prevents movement that would stress diaphragm 40 beyond its elastic limit. If the force between the studs is compressive there is also the possibility of damage to diaphragm 40 and such damage is prevented by restraining cover 90. When an excessive compressive force occurs fluid pressure may cause resilient conical section 42 to bulge (not illustrated) in the direction of flange 80. Restraining cover 90 interposes itself to limit the bulging of resilient conical section 42.

The thermal expansion coefficient of liquid 98 is greater than the thermal expansion coefficient of the steel of which the structural parts of force sensor 10 are made. When temperature changes occur liquid 98 expands or contracts more than the volume wherein it is confined. Diaphragm 40 maintains a constant pressure in liquid 98 by maintaining a constant force on the area of liquid 98 which it and armature 60 contact. The constant pressure causes the output of pressure sensor 50 to remain constant as the temperature changes.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A force sensor comprising piston means for converting applied force to hydraulic pressure in a liquid confined in a chamber and including means for sensing the pressure in said liquid, the improvement comprising:

a spring providing a constant force causing a predetermined pressure in said liquid when said applied force is absent.

2. The invention as defined by claim 1 wherein:

said piston means comprises said spring.

3. The invention as defined by claim 1 wherein:

said spring comprises a diaphragm.

4. The invention as defined by claim 3 wherein said diaphragm comprises a resilient element having a shape adapted for providing said constant force and wherein, said chamber is defined by a body and an armature joined for relative axial movement by said diaphragm.

5. The invention as defined by claim 4 wherein:

said resilient element is unitary with inner and outer flanges and said flanges are attached by sealing means to said body and to said armature whereby said chamber is sealed against liquid leakage.

6. The invention as defined by claim 5 wherein said sealing means is a weld.

7. The invention as defined by claim 5 wherein said sealing means is a braze.

8. The invention as defined by claim 4 wherein:

said diaphragm is adapted to allow relative movement between said body and said armature in the direction of an axis and to simultaneously resist relative movement between said body and said armature in directions perpendicular to said axis.

9. The invention as defined by claim 3 and including:

a restraining cover adapted to limit stress in said diaphragm in the event said applied force becomes excessive.

10. The invention as defined by claim 1 and including:

electricity conducting means residing in a passage defined by passage surfaces extending between the interior of said chamber and the exterior of said chamber for conducting electrical signals indicating the pressure sensed by said pressure sensing means.

11. The invention as defined by claim 10 made by a process comprising:

said electricity conducting means being injection molded into an electrical insulator comprising thermoplastic injection molding material selected for providing a liquid tight seal when molded around electrical conductors, and said electrical insulator being sealed into said passage by a process of heating said passage surfaces and placing said electrical insulator into said passage whereupon said passage surfaces cool and contract and form a liquid tight seal between said electrical insulator and said inside diameter.

12. The invention as defined by claim 10 wherein:

said electricity conducting means comprises precisely two electrical conductors, and said means for sensing the pressure in said liquid communicates said pressure through said two electrical conductors and also obtains power for operation through said two electrical conductors.

13. The invention as defined by claim 12 wherein:

said means for sensing the pressure in said liquid communicates through said two electrical conductors by drawing current through said two electrical conductors and wherein said pressure is communicated by said current.

14. A force sensor comprising:

a body having a body surface and an armature having an armature surface, a washer comprising spring metal and having a washer surface, an inner attachment means integral with said washer, an outer attachment means integral with said washer, a liquid filled chamber defined by a chamber surface, and means for sensing pressure of said liquid, and wherein said chamber surface comprises said body surface, said armature surface, and said washer surface, and one of said attachment means is sealingly affixed to said body and the other of said attachment means is sealingly affixed to said armature.

15. The invention as defined by claim 14 wherein:

said washer is adapted to cause a predetermined pressure in said liquid, said predetermined pressure being constant over a range of temperatures.

16. The invention as defined by claim 14 wherein:

said washer has an axis of rotational symmetry and said washer allows movement of said armature relative to said body in the direction of said axis and resists movement of said armature relative to said body in directions perpendicular to said axis.

17. The invention as defined by claim 16 wherein:

said washer is adapted to cause a predetermined pressure in said chamber when no force is being applied between said body and said armature.

18. The invention as defined by claim 14 wherein:

said means for sensing pressure draws electric current, and said means for sensing pressure indicates sensed pressure by controlling said electric current.

19. The invention as defined by claim 14 wherein:

a said attachment means, a said attachment means comprises a flange, and said flange is sealingly attached to said armature by welding.

20. The invention as defined by claim 14 wherein:

a said attachment means comprises a flange, and said flange is sealingly attached to said armature by brazing.

21. The invention as defined by claim 14 and including:

a restraining cover adapted to limit stress in said washer in the event of excessive axial force between said body and said armature.

* * * * *